United States Patent Office 2,950,702
Patented Aug. 30, 1960

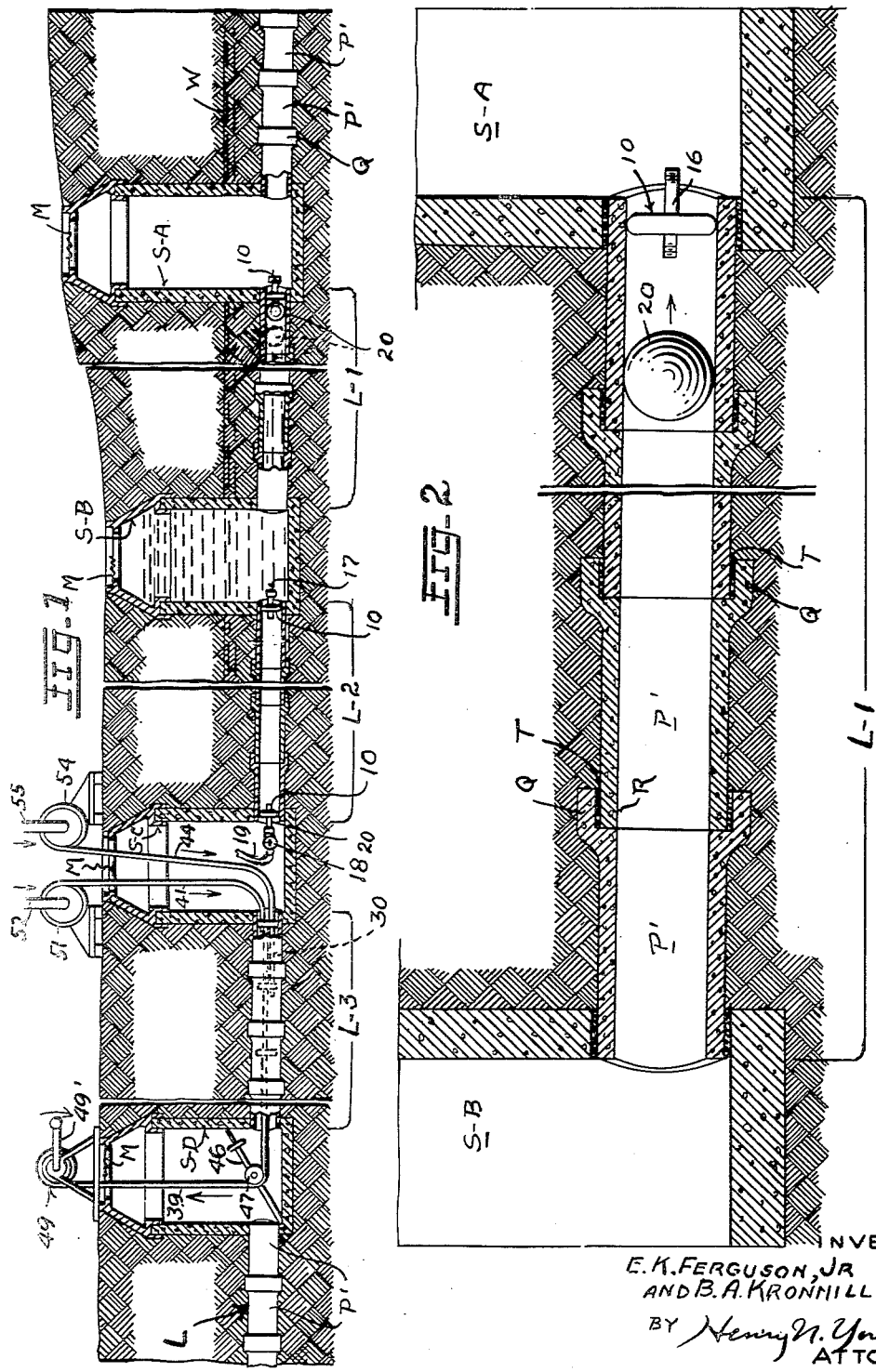

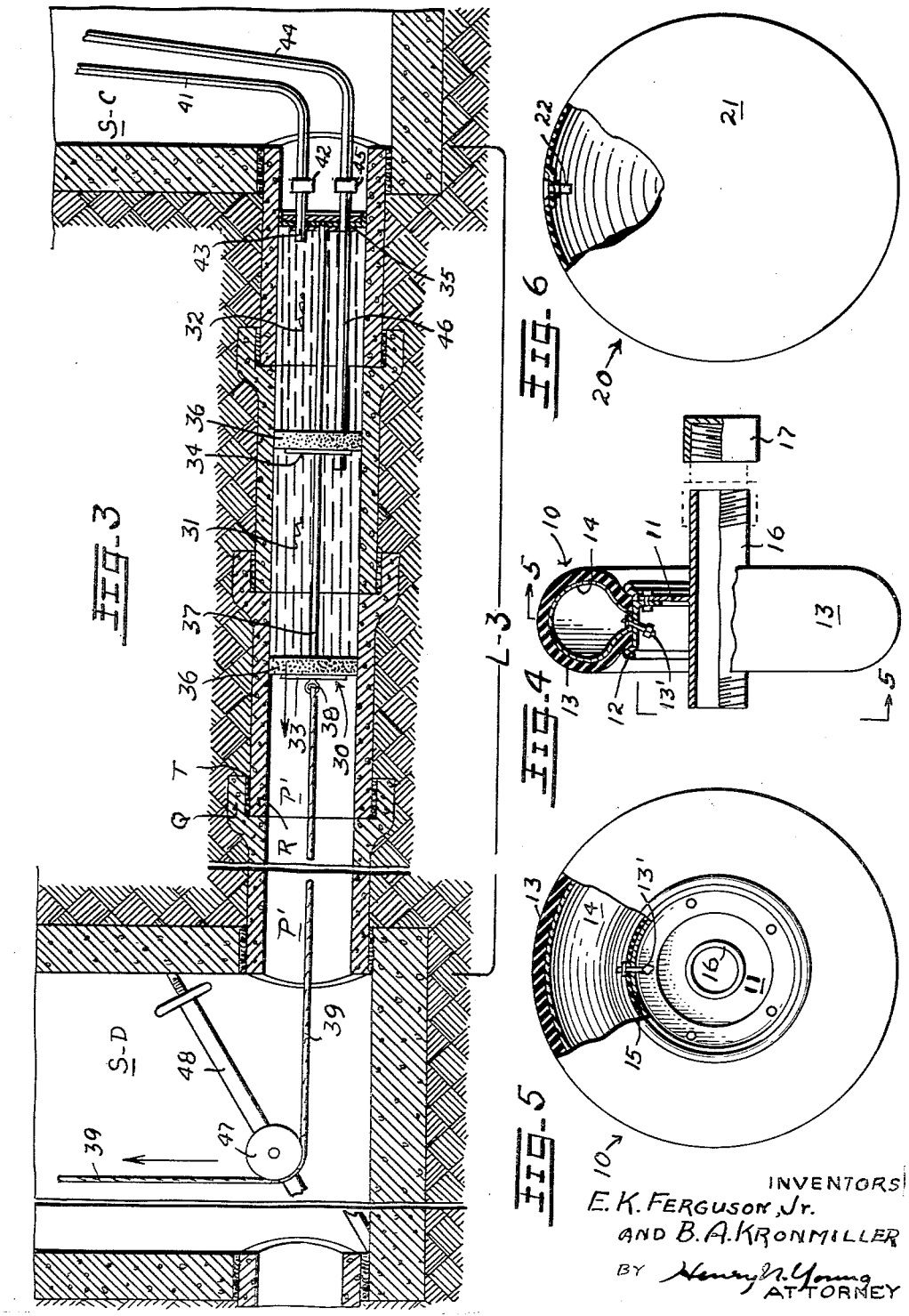

2,950,702

PIPE SEALING DEVICE

Eli K. Ferguson, Jr., 16127 Via Tomar, San Lorenzo, and Bill A. Kronmiller, 1642 Moreland Drive, Alameda, Calif.

Filed May 23, 1955, Ser. No. 510,092

3 Claims. (Cl. 118—408)

The invention relates to a method and means for sealing an installed subterranean pipeline carrying an aqueous liquid and subject to lateral leakage through it.

As is well known, installed pipelines for carrying water or water-borne materials, and formed of pipe sections connected at bell or similar joints for allowing flexibility in aligning and laying the pipe, usually become subject to more or less leakage at their joints subsequent to their installation. Also, such pipelines may have or acquire points of leakage or seepage at other portions than at their section points by reason of porosity or spot deterioration or the formation of cracks therein. Accordingly, it is frequently necessary to subsequently seal such pipelines against exfiltration or infiltration at the joints and elsewhere, and it is a present general object to provide and apply a particularly efficient pipe-sealing composition in such a pipeline.

Another object is to provide a particularly effective method for applying the pipe-sealing material progressively along a pipe bore at a controlled rate for insuring a most efficient application of the sealing material at leakage or seepage points of an installed pipe.

A further object is to provide a particularly simple and effective apparatus for carrying out a pipe-sealing operation of the character described.

A more specific object is to provide means for effecting a sealing application in a pipeline of flocs of a hydrous metallic silicate selected from the mineral group consisting of saponite and bentonite.

An added object is to provide a pipeline sealing treatment which progresses in successive stages to finally provide a highly efficient and generally complete and permanent sealing of the pipeline.

The invention possesses other objects and features of advantage, some of which, with the foregoing, will be set forth or be apparent in the following description of typical embodiments thereof, and in the accompanying drawings, in which, Figure 1 is a longitudinal and fragmentary sectional view of a subterranean pipeline comprising sections connecting standpipes which provide manholes in the line and having apparatus of the present sealing device operatively installed with respect to the pipeline.

Figure 2 is an enlarged fragmentary view showing a sealing arrangement utilizing a movable pressure-controlled partitioning element in a pipeline section.

Figure 3 is a section at the scale of Figure 2 showing an alternatively usable apparatus relatively for high-pressure and progressive sealing of a pipe section by means of a moving head utilizing relatively small quantities of sealing materials.

Figure 4 is an enlarged partly sectional edge view of a bore-closing plug of the apparatus.

Figure 5 is a partly sectional view taken at the broken line 5—5 in Figure 4.

Figure 6 is a partly sectional view of the pipe-partitioning unit element of Figure 2.

As particularly illustrated, the features of our invention are shown as applied in the sealing of a subterranean pipeline L disposed below a ground-water level W and having successive pipe sections P' connected at suitable joints thereof, with portions of the line connecting relatively large standpipes S of suitable structure providing manholes M at their tops. The pipeline L may carry various aqueous liquids such as natural water for domestic or irrigation use, water-borne sewage, or drainage water, it being noted that the particular aqueous liquid to be carried by the pipeline L is generally immaterial with respect to the final sealing of the pipeline by the present methods and means. Also, it will be understood that the standpipes S essentially provide anti-surge or overflow passages in the line, with manhole covers normally required only where the pipeline extends beneath utilized ground surface portions, as a roadway. The present pipe sections have bell and spigot portions Q and R at their opposite ends and each line joint so provided is primarily sealed by a suitable packing T which is compacted within the bell Q against the exterior of the received spigot R of the next pipe section.

In pipe lines of the present character, the standpipes S are usually of concrete structure, while the pipe sections P' may be of concrete or ceramic or metallic compositions, and it will be understood that such pipe line elements are generally subject to leakage at their joints and elsewhere in a direction determined by an excess of hydraulic pressure within or about the line. Even though such pipe lines are usually substantially leakproof when originally installed, deterioration with age and/or cracking and/or the penetration of plant roots may result in a serious aggregate line leakage which it is the primary purpose of the present sealing device to eliminate or at least reduce to a minimum. Accordingly, and as particularly illustrated, the sealing device of our invention is shown as applied to an installed pipeline which is submerged in ground water extending from the level of the waterline W which is intermediate the pipes of the line and the top of the ground. Referring particularly to the showing of Figure 1, it will be noted that the installed pipeline L slopes downwardly to the right whereby a gravity liquid flow through the pipeline will also be toward the right of the view. The present pipeline L includes successive runs of pipe sections P' connecting a succession of standpipes S–A and S–B and S–C and S–D which extend upwardly to or beyond the ground surface thereat.

It will now be noted that a sealing of the pipe line is arranged to be effected from the interior thereof by providing water-borne flocs of a metallic silicate within the pipeline for their flow with escaping water into leakage passages of the pipeline until they have sealed said passages. More specifically, the mineral saponite comprising a hydrous magnesium-aluminum silicate is a preferred source of the silica gel of the sealing flocs. The use of saponite as a source of the sealing flocs is preferred by reason of the superior behavior of water-borne saponite in the presence of certain flocculating and setting materials which are hereinafter discussed; it is to be noted, however, that the mineral bentonite is usable for the present purpose, though its flocculating properties in water suspension thereof are not as complete or pronounced as with saponite. Also, for assuring a complete sealing of a pipeline under treatment, the sealing medium may usually be most advantageously applied within a pipeline in successive stages of preliminary silica sealing and silica concentrating and silica setting by the successive application of certain compositions which cumulatively provide the final seal, and are hereinafter, for ready reference, designated as Compositions A and B and C.

As is particularly illustrated, the apparatus for carrying out certain line-sealing steps by use of the various Compositions A and B and C is shown as installed in connection with line sections, or pipe runs, L–1 and L–2 and L–3 which connect successive standpipes of the pipeline L. The elements of said apparatus include sealing plugs 10 for removably fitting the ends of the line sections, valves 18 for possible use with the plugs 10, a spherical partition 20 movable along a pipeline section under pressure control and a compartmenting partitioning head 30 which is progressively movable in a said line section.

With particular reference to the various compositions used in carrying out our process, said compositions are identified essentially as follows:

*Composition A.*—A water-suspension or slurry of saponite comprising 1.5% to 4.0% by dry weight of saponite; this corresponds to a slurry strength of approximately 3.0% to 8.0% of the commercially available pulverized mineral saponite.

*Composition B.*—A mixture consisting of 50% by volume of Composition A and 50% by volume of an aqueous sodium silicate solution having a ratio of alkali to silica of 1/3.22, with a gravity of 41° Baumé and a viscosity in poises of the aqueous sodium silicate solution of approximately 1.8.

*Composition C.*—A solution containing 5% to 7% of sodium bicarbonate by weight, or other salts or acids which are acidic to the sodium silicate solution of Composition B, such as calcium chloride, sodium bisulphate, sulphuric acid, etc., and selected upon the basis of the reaction time available and the quality or type of final silica gel desired.

By particular reference to Figures 1 and 2 and 4 and 5, it will be noted that a sealing plug 10 essentially comprises a disc 11 provided with a continuous axial edge flange 12 which functions as a rim to mount an inflatable hollow tire-like sealing ring 13. The sealing ring 13 encloses a continuous inner tube 14 from which a valve-stem 13' providing a normally closed check valve extends through the rim 12 of the disc for use in inflating the ring with air; the size of the deflated ring 13 is slightly less than the bore of pipe sections to be engaged by it, whereby the inflation of the ring will sealedly and axially fix it within said pipe bore. A relatively short and terminally-threaded pipe nipple 16 extends axially through the plug disc 11 in sealed relation thereto and is arranged to sealedly mount a cap 17 or a shut-off valve 18 on either end thereof. The sealing plugs 10 are arranged for fixed installation in the ends of the installed pipeline sections connecting adjacent standpipes S, and are so positioned in the section ends receiving them that the inflation valve-stem 13' is accessible from the adjacent standpipe spaces.

The structure of a movable partition 20 is brought out in Figures 2 and 6, and this element comprises an inflatable hollow sphere or ball 21 of rubber or the like provided with a normally closed air-input check valve 22 of a usual structure at a side point thereof, with the valve structure extending solely inwardly from the exterior surface of the sphere. The valve 22 is arranged to provide for a maintained inflation of the ball to such a size thereof that it may under certain pressure conditions roll through a pipeline section while sealedly engaging the section bore to function as a moving partition therein.

By particular reference to Figures 1 and 2, it will now be noted that the line section L–1 and the standpipe S–B are shown therein as blocked off or isolated from the rest of the line by means of the operative application of plugs 10 at the end of the line section L–1 at the standpipe S–A and at the end of the adjacent pipe section L–2 where it enters the standpipe S–B, said plugs having their nipples 16 closed at their exposed ends by caps 17. The pipeline portion thus blocked off is preferably filled with the aqueous mud or slurry of the Composition A up to a level in the associated standpipe which is preferably at least five feet above the ground-water level W, or above the pipeline level if the pipeline is not submerged in ground water, whereby to preferably provide a positive working pressure head of at least five feet in the section and so prevent an inflow of the ground water at leakage points of the line section under treatment. The slurry charge so placed is allowed to stand for at least four hours or until its working level in the standpipe remains effectively constant as indicating that leakage from that pipe section has substantially or completely ceased by reason of a preliminary filling of any leakage passages and the adjacent back-fill with the sealing flocs from the slurry.

In case a particular standpipe S does not extend for the required height above the ground-water line N, or the unsubmerged pipeline thereat, to provide the desired five-foot minimum pressure head for the treating liquid in a particular pipe section, the added pressure head may be provided by temporarily and sealedly mounting an extension collar (not shown) on the standpipe at its manhole for permitting a building up of the required pressure head of the treating composition in the standpipe and pipe section. Alternatively, a sealing plug 10 may be sealedly engaged in the upper end of the pipe section under treatment and have a valve 18 mounted on its nipple end extended into the standpipe, said valve connecting a hose 19 with the opened valve for supplying the fluid treating composition at any required rate and pressure in the pipe section; this arrangement is indicated in Figure 1 for the pipe section L–2.

When the apparent sealing utility of the deposited Composition A charge has substantially ceased in the line portion L–1, as indicated by its maintained level in the standpipe S–B due to a lowering of the seepage rate, the remainder of this slurry charge is removed from the pipeline in a manner which does not flush the deposited flocs from the seepage openings of the pipeline in which they are lodged. In order to insure a cleaning out of the Composition A charge from within the line portion L–1, the nipple 16 at a lower end of the section is uncapped to temporarily lower the level of the remaining charge to that of the pipeline, and a removable partition ball 20 is then operatively inserted behind the remaining portion of the charge in the pipe; in this manner, the introduction of a substitute liquid in the blocked-off standpipe in the line section may cause the ball 20 to push out the earlier-applied liquid ahead of it under the pressure of the substitute liquid until the member 20 engages the opposite nipple end as a valve means to seal off the flow of liquid through the nipple of the plug 10. To avoid the chance of a failure of the action of the ball 20 as a valve with respect to a plug nipple 16, the cap 17 is preferably replaced on the nipple 16 before the pressure head of a succeeding liquid charge has been built up, this being the condition indicated in Figure 1 in which the ball 20 engages the opposed nipple end as having been used to clear the pipe section of its prior non-sealing liquid contents as the sealing treatment of the section was started by filling the section with the Composition A behind the ball 20.

Upon the removal of the Composition A charge from the line section L–1, a charge of the Composition B slurry is introduced into this blocked-off line portion to build up the same hydrostatic pressure as was used for the first slurry of Composition A in the section, and this new charge is allowed to stand for from one to four hours for adding to the previous sealing deposits of saponite flocs to thicken and stiffen the deposits by reason of the added flocculating action of the sodium silicate therein on the saponite in the Composition B and on the flocs previously deposited from the Composition A. A subsequent similar replacement of the used Composition B by a charge of the Composition C solution may generally be effected by a repeated use of the ball 20 in the same manner as during the introduction of the charge of Composition B to the line section L–1, after which the hydrostatic pressure of the replacing charge is preferably increased over that used for the two first steps by adding to the effective head of the liquid in the standpipe S–B to insure a forcing of the setting chemical of the composition into the positioned seal, as by utilizing a valve 18 and pressure hose 19 at a plug 10 installed at the upper end of the line section under treatment in the arrangement shown for the section L–2, which may be assumed to have been subjected to the first two described treating stages with the Compositions A and B, or to have all of its treating stages effected by its use of the ball 20 and the valve 18 and hose 19 in the described manner.

Considering the previously described method and means used for sealing the pipe section L–1, it will be understood that the different stages might generally be simultaneously carried on in a disclosed manner in a succession of three alternate blocked-off sections, with the sealing steps progressive in the same direction along the pipeline. Also, in case the leakage rate is originally small enough at a given section before treatment, the Composition A treatment may be omitted therefor. The treatment in two or three stages is understood to be generally such that it may be completed in a progressive manner along the pipe line for minimizing the required movement and spread of the apparatus used. Also, the portion of any of the compositions used in the present pipe-sealing process which has not escaped by seepage from the line may be salvaged and prepared for its reuse by bringing it back to its best initial strength by adding an appropriate amount of the seal-providing ingredients or water to it as required, this being particularly valuable in the case of the Compositions B and C in which the chemical ingredients are relatively expensive.

By particular reference to Figures 1 and 3, it will be now noted that the movable head 30 provides chambers 31 and 32 between axially aligned and fixedly spaced discs 33 and 34 and 35 which are provided with similarly directed one-way resilient sealing rings on and opposite their peripheries, whereby the discs are independently sealed for a one-way movement in the bore of the pipe run or section engaged by the head. A spreader rod 37 axially connects the discs 33 and 34 and 35 in fixed relation thereto and is provided with a terminal eye 38 beyond the disc 33 for its engagement by a pull cable 39. A flexible hose 41 extends to a coupling 42 provided at the outer end of a pipe 43 sealedly engaged through the disc 35 and extending into the chamber 32, and a flexible hose 44 extends to a coupling 45 provided by a pipe 46 extending through the discs 34 and 35 into the chamber 31.

A head 30 is shown as installed in the line section L–3, and the pull cable 39 extends from the eye 38 of the head 30 into the space of the standpipe S–D, upwardly about a pulley 47 temporarily fixed in the bottom of the standpipe space by a supporting and positioning jack-bar 42, and thence about the drum of a windlass 49 suitably supported over the manhole of the standpipe; the arrangement is such that a turning of the crank handle 49' of the windlass 49 may progressively pull the head through the line section L–3, while pulling the hoses 41 and 44 from about hose reels 51 and 54 respectively and to which waterborne materials of the appropriate sealing compositions are arranged to be provided at connections 52 and 55 respectively, said hose reels being disposed on the ground surface adjacent the standpipe S–C.

In the use of the head 30, the advance chamber 31 is continuously supplied with a Composition B and the chamber 32 is continuously supplied with a Composition C, both at a maintained pressure at least as great as that provided by a five-foot head of water over the exterior pressure at the pipeline section receiving the head. The head is advanced at such a rate that the floc sealing from the Composition B is complete at a leakage point before the Composition C is operative at that point to set the floc deposit before the head has progressed beyond that point. In practice, it has generally been found that an advantageous rate of advancement of the head is between 1 to 4 feet per minute depending on the effective porosity of the treated pipe portion, whereby the use of a hand-operated windlass 49 may be preferable to a power-operated windlass for pulling the cable 39.

The working pressures in the chambers may be variously ascertained and maintained in terms of the seepage rate from the chambers 31 and 32 of the moving head in any suitable manner, it being understood that the present apparatus is particularly useful for use with shallow or surface pipelines lacking standpipes in which the required static pressures may be maintained. A further advantage of the use of the head 30 lies in the fact that less sealing material is in use as compared with the method using the standpipes for building up the required pressure head. If a pipeline section has a moderate leakage rate, the use of a head 30 therein is usually found sufficient to provide the needed seal; otherwise, the treated section would advantageously be treated in accordance with the first stage of gravity pressure treatment with the Composition A of the first described sealing process. When a full traverse of a head 30 through a line section has been completed, the section is flushed with clean water to remove any flocs of the sealing material from the pipe bore, this procedure also following an application of the Composition C by the previously described methods.

In the application of the sealing Compositions B and C, with or without the Composition A, by any of the hereinbefore described methods or combinations of methods, it has been found in practice that leakage elimination runs from about 85% to 98% of the initial leakage rate as comprising a most satisfactory result for practical purposes. It is to be particularly understood that the present pipeline sealing process provides a plug of a relatively tough and insoluble gel-like silica material with considerable plasticity in a leak opening of a pipe joint or break and in the adjacent earth. Also, a present sealing gel retains its sealing qualities in the presence of water, whereby the seal provided is particularly valuable for pipelines carrying aqueous liquids. And it is to be further noted that a sealing plug provided at a pipe leak opening in the described manner is usually more or less beaded at its outer end and is thereby keyed in place against its inward pressure dislodgment in case the pressure about the pipeline exceeds that within it, as is a usual condition with sewage and drainage lines, for instance.

From the foregoing description, taken in connection with the accompanying drawings, the advantages of the present pipeline sealing device may be readily understood by those skilled in the art to which the invention appertains. While we have described forms of our invention which we now consider to comprise preferred embodiments thereof, we desire to have it understood that the showings are primarily illustrative, and that such changes and developments may be made, when desired, as fall within the scope of the following claims.

We claim:

1. In a device for sealing leakage openings in a pipeline portion of uniform bore, fixed and movable partitions sealedly engaging the bore to close off between them a pipeline portion for enclosing a charge of an aqueous slurry comprising a water-flocculated clay, said fixed partition comprising a disc having a pneumatically inflatable rim releasably engaging the bore while sealedly fixing the partition in the bore and having a normally closed flow passage therethrough, and means for moving said movable partition toward the fixed partition for creating and maintaining in said flocculated clay charge a constant positive pressure exceeding the external pressure against said pipeline portion for effecting the pressure escape of the charge into said openings for a retention of the escaping flocs of clay as a sealing means in said openings.

2. A structure in accordance with claim 1 having means at a disc side for use in inflating said rim and means at the same disc side for opening said flow passage thereat.

3. A structure in accordance with claim 1 in which the movable partition comprises a pneumatically inflated ball sealedly engaging the pipeline bore and arranged for its movement toward the fixed partition by fluid pressure applied behind it and to a limiting position in which it closes the opened flow passage.

References Cited in the file of this patent

UNITED STATES PATENTS

| | | |
|---|---|---|
| 907,724 | Boyle | Dec. 29, 1908 |
| 1,631,265 | Harris | June 7, 1927 |
| 1,788,706 | Cross | Jan. 13, 1931 |
| 1,796,338 | Moore | Mar. 17, 1931 |
| 1,888,961 | Chappell | Nov. 22, 1932 |
| 2,038,160 | Billings | Apr. 21, 1936 |
| 2,321,658 | Chester | June 15, 1943 |
| 2,338,266 | Skoning | Jan. 4, 1944 |
| 2,364,911 | O'Sella | Dec. 12, 1944 |
| 2,445,645 | Stephens | July 20, 1948 |
| 2,482,925 | Mercer | Sept. 27, 1949 |

OTHER REFERENCES

Volclay: Data No. 230–31, preliminary Report of October 1937. Data No. 202–M1 and 2, data No. 226, pages 1 and 2, Data No. 232, page 2.